[11] 3,578,957

[72] Inventor James A. Gatlin
Bowie, Md.
[21] Appl. No. 828,984
[22] Filed May 29, 1969
[45] Patented May 18, 1971
[73] Assignee The United States of America as represented by the Administrator of the National Aeronautics and Space Administration

[54] SAMPLED DATA CONTROLLER
13 Claims, 6 Drawing Figs.
[52] U.S. Cl. .................................................. 235/150.1,
235/151.1, 235/150.27, 235/150.2
[51] Int. Cl. ........................................................ G05b 21/02,
G05b 11/10, G05d 1/08
[50] Field of Search ....................................... 235/150.1,
105.2, 150.25, 150.4, 151.1, 151.11

[56] References Cited
UNITED STATES PATENTS
3,460,096  8/1969  Barron .......................... 340/172.5

Primary Examiner—Eugene G. Botz
Assistant Examiner—R. Stephen Dildine, Jr.
Attorneys—R. F. Kempf, E. Levy and G. T. McCoy ABSTRACT: A sampled data feedback controller includes means for deriving a plurality of error signals within a single control formulation time interval. The error signals are derived by comparing the response of a plant with a reference input, constant over the interval, in a servo subtraction node. Each of the sampled errors is applied to an accumulator with a weighting factor, having a value selected on a predetermined basis, determined by the plant characteristics, to provide finite plant settling time. At the end of each control formulation interval the previous output of the accumulator is fed back to the accumulator, through a weighting factor network. The output of the accumulator at the end of each formulation interval is applied as a control input to the plant. In a specifically disclosed embodiment, the plant is a spin stabilized, attitude controlled satellite.

INVENTOR,
JAMES A. GATLIN
ATTORNEYS

INVENTOR,
JAMES A. GATLIN
ATTORNEYS

SAMPLED DATA CONTROLLER

ORIGIN OF INVENTION

The invention described herein was made by an employee of the United States Government and may be manufactured and used by or for the Government for governmental purposes without the payment of any royalties thereon or therefor.

INTRODUCTION

The present invention relates generally to sampled data feedback controllers and, more particularly to a controller wherein a control signal is derived in response to a plurality of sampled error values and the value of a previously derived control signal.

Presently known sampled data controllers generally include means for deriving a control signal that is updated at intervals equal to or smaller than the time between derivation of error samples. In other words, prior art sampled data controllers normally include means for sampling a reference signal and an output signal of a plant being controlled at the same rate as input signals are applied to the plant; in the alternative, control signals are applied to the plant at a rate greater than the sampling rate of an error signal responsive to a reference input and a plant output response. Because of this factor, prior art sampled data controllers generally employ a plurality of memory elements for storing a multiplicity of past sampled errors that are utilized to derive a control signal for the plant. Because a plurality of memory elements are generally utilized with prior art sampled data controllers, such controllers usually have relatively complex hardware implementation.

In accordance with the present invention, a sampled data controller is provided wherein an error signal is sampled a plurality of times within a single control formulation interval to derive a single control signal. The control signal during any control period is derived by integrating or accumulating values proportional to error signals sampled during the control period and the previous control signal. The error and previous control signals are modified by suitable weighting factors determined by a plant being controlled, with the weighting factors for different samples being variable as a function of the sample number within the control period. Preferably, the weighting factors are selected to provide finite settling time for the plant response to a disturbance in the plant dynamic state and to minimize input noise transmission. Finite settling time for a plant response means that a plant, even one having time lead and lag characteristics, can be brought to an equilibrium point after being disturbed from an initial condition within a finite, rather than infinite, time interval.

It is characteristic of systems properly designed in accordance with the present invention that the transient response, governed by the finite settling time, is independent of the amount of noise filtering imposed on the system by the controller. Hence, a plant driven by a controller in accordance with the present invention can be driven to an output value within a predetermined plurality of control intervals independently of the filtering time necessary to remove noise. This feature is in contrast with most prior art systems wherein filtering time and transient response time are interrelated with each other so that a fast transient response is usually associated with poor noise filtering response and vice versa. Controllers utilizing the principles of the present invention can be provided with a fast transient response and adverse effects of noise can be filtered or minimized by judicious selection of the weighting coefficients. A further advantage of the present invention is that the complexity and amount of hardware utilized can be reduced relative to prior art sample data controllers since only a single memory element need be utilized for deriving each controller output signal.

In accordance with one specifically disclosed embodiment of the invention, the principles thereof are applied to an attitude controller for a spin stabilized cartwheel satellite, that is, a satellite having its spin axis maintained normal to the satellite orbital plane. Pulses derived in response to an angularly scanning optical pickup on the satellite derive signals indicative of the satellite attitude. These variable position signals are compared with a reference pulse train to derive variable pulse width or duration error signals. The error signals are weighted as a function of time position within a control formulation interval. The weighted signals are stored in an accumulator register which drives a digital-to-analog converter upon the completion of each control formulation interval. The digital-to-analog converter output is applied as the control input to a magnetic torquer for the satellite attitude control. For this particular application, it has been found that by utilizing four error samples within each control signal interval nearly minimum noise sensitivity and finite settling time of two control signal intervals can be attained with a relatively simple digital implementation.

It is, accordingly, an object of the present invention to provide a new and improved sampled data feedback controller.

Another object of the present invention is to provide a new and improved sampled data feedback controller wherein noise filtering is independent of transient response.

An additional object of the present invention is to provide a new and improved sampled data feedback controller utilizing relatively simple digital hardware.

Another object of the invention is to provide a new and improved sampled data feedback controller wherein an error signal is sampled a plurality of times during each formulation of a control signal.

Still another object of the present invention is to provide a sampled data feedback controller wherein weighted coefficients for sampled errors and a controller feedback input are selected in a predetermined manner, dependent upon characteristics of a plant being controlled, to enable finite settling time and a high degree of noise filtering to be obtained.

Still another object of the present invention is to provide a new and improved system for controlling the attitude of a satellite in orbit.

Still a further object of the invention is to provide a new and improved system for controlling the attitude of a cartwheel satellite wherein the satellite has a finite settling time and system noise has virtually a minimum effect.

The above and still further objects, features and advantages of the present invention will become apparent upon consideration of the following detailed description of one specific embodiment thereof, especially when taken in conjunction with the accompanying drawings, wherein:

DETAILED DESCRIPTION OF THE DRAWINGS

Figure 1:
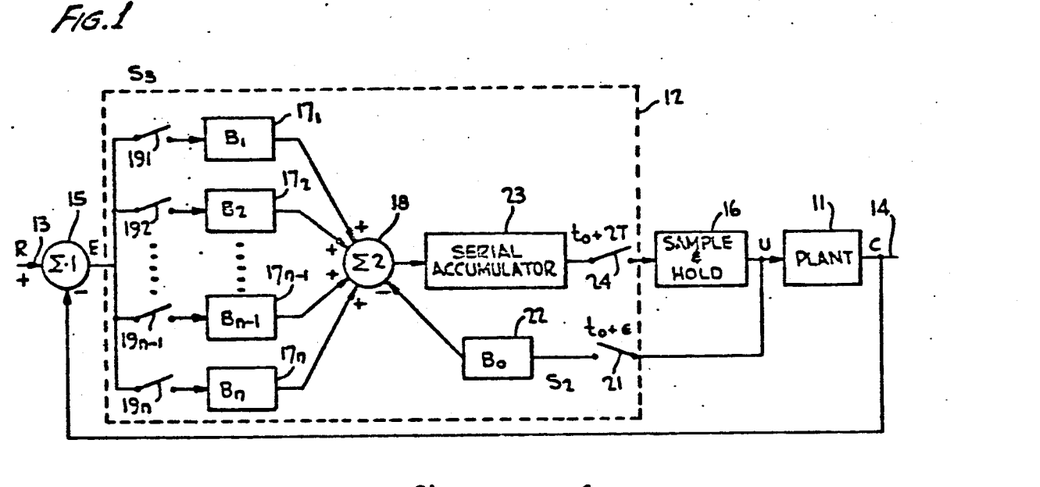
FIG. 1 is a block diagram illustrating the principles of the present invention in broad terms.

Reference is now made to the block diagram of FIG. 1 wherein a plant 11 to be controlled is responsive to a controller 12 and a reference input signal on line 13. Plant 11 includes means for deriving an output signal, C, on line 14 indicative of a characteristic thereof, such as position. The input versus output response of plant 11 is such that the plant can be represented by a set of linear differential equations having real, but not necessarily finite, eigenvalues so that certain attenuation or weighting factors within controller 12 can be selected to enable the plant to have a finite settling time and maximum noise filtering, i.e., minimum noise sensitivity.

The response, C, of plant 11 is derived on line 14 and compared with a reference input signal, R, on line 13 in subtraction node 15 which derives an error signal, E, indicative of the difference between the inputs thereof (R−C). The error signal derived from node 15 is applied to the input of controller 12 which is also responsive to the input signal, U, for plant 11. The input signal to plant 11 is derived by periodically feeding the output of controller 12 to sample and hold network 16, which maintains the value of U constant over an entire control-signal formulation interval of controller 12. The output of sample and hold network 16 is applied in parallel to plant 11 and to an input terminal of controller 12.

The error signals derived from node 15 are applied in sequence during a control-signal formulation interval to weighting factor networks $17_1, 17_2...17_{n-1}$ and $17_n$, which feed summing node 18. Each of weighting networks $17_1-17_n$ is responsive to the error output signal of difference node 15 once during each control signal interval in response to switches $19_1-19_n$ being closed and opened in sequence, at times $t_0+t_1, t_0+t_2 ... t_0+t_{n-1}, t_0+t_n$, respectively, where $t_0$ is time at the beginning of control formulation interval. Each of switches $19_1-19_n$ is closed at a different instant of time and for a relatively short portion of each control formulation interval of controller 12. Thereby, during each control formulation interval, having a 2T-second period, there are applied to summing node 15, n sampled error signals occurring at times $$\frac{1}{n}2T, \frac{2}{n}2T, \ldots \frac{n-1}{n}2T, 2T,$$

respectively having values of $B_1E, B_2E...B_{n-1}E, B_nE$, where $B_1, B_2...B_{n-1}$ and $B_n$ are the coefficients of networks $17_1, 17_2...17_{n-1}$ and $17_n$, respectively.

Prior to any of switches $19_1-19_n$ being closed at time $$(t_0+\epsilon), \epsilon < \frac{2T}{n},$$

the output of sample and hold network 16 is fed to a difference input terminal of summing network 18 in response to switch 21 being closed and then opened. The output of sample and hold network 16, indicative of a control input to plant 11, is modified by a weighting factor $B_0$ in network 22 so that the difference input to linear combining node 18 is representative of $B_0U$. Hence, in response to the signals applied to node 18, the node derives during each control-signal formulation interval of controller 12 a sequential series of sampled signals, each having a value commensurate with the outputs of weighting factor networks $17_1-17_n$ and 22. The signal derived from summing node 18 during the first sampling period is representative of the previous input control to plant 11 and has a value $-B_0U$. Immediately after the $-B_0U$ sample has been derived from summing node 18, the first error sample is derived from the summing node as $B_1E=B_1a(R-C)$. After the $B_1E$ signal is derived from the output of summing node 18, switch $19_1$ is opened and switch $19_2$ is closed to feed a signal commensurate with $B_2E$ through the summing node. In the foregoing manner, there are derived from summing node 18 a plurality of sampled errors and the previous sampled control value during each control-signal formulation interval of controller 12.

The sampled outputs of summing node 18 are applied to serial accumulator 23 which functions effectively as a finite time integrator. Accumulator 23 is preferably a digital register having the count thereof modified in accordance with the amplitude and polarity of each sample derived from summing node 18 during a control signal interval. At the beginning of each control formulation interval, the count stored in serial accumulator 23 is zero; at the end of each sampling interval the count in the serial accumulator is indicative of each of the sampled errors, as modified by the weighting factors $B_1-B_n$, subtracted from the previous input control to plant 11, as modified by the weighting factor of network 22. Mathematically, the output of serial accumulator 23 at the end of a control signal interval of 2T can thereby be represented as $$U_{\pi}=-B_0U_0-B_1E_1-B_2E_2...-B_{n-1}E_{n-1}-B_nE_n \quad (1).$$

where:

$U_0$ is the output of the serial accumulator at the end of the previous control-signal formulation interval.

The signal stored in serial accumulator 23 at the end of each control signal interval is applied through switch 24, at time $t_0+2T$ (where 2T is the length of each control formulation interval) to sample and hold network 16 which immediately changes value in accordance therewith. After sample and hold network 16 has responded to the output of serial accumulator 23, switch 24 is opened and the serial accumulator is cleared to zero. A new sampling interval then commences with the closing of switch 21 to gate the new value of U in sample and hold network 16 through attenuating network 22 and summing node 18 into serial accumulator 23. During the new control formulation interval the operation of controller 12 continues in the manner described to feed sampled signals into serial accumulator 23 and drive plant 11 periodically with control signals derived from sample and hold network 16. In response to variations in the output of sample and hold network 16, at the end of each control signal interval, plant 11 is driven in a predictable manner, governed by its characteristic differential equations.

Figures 2, 4:
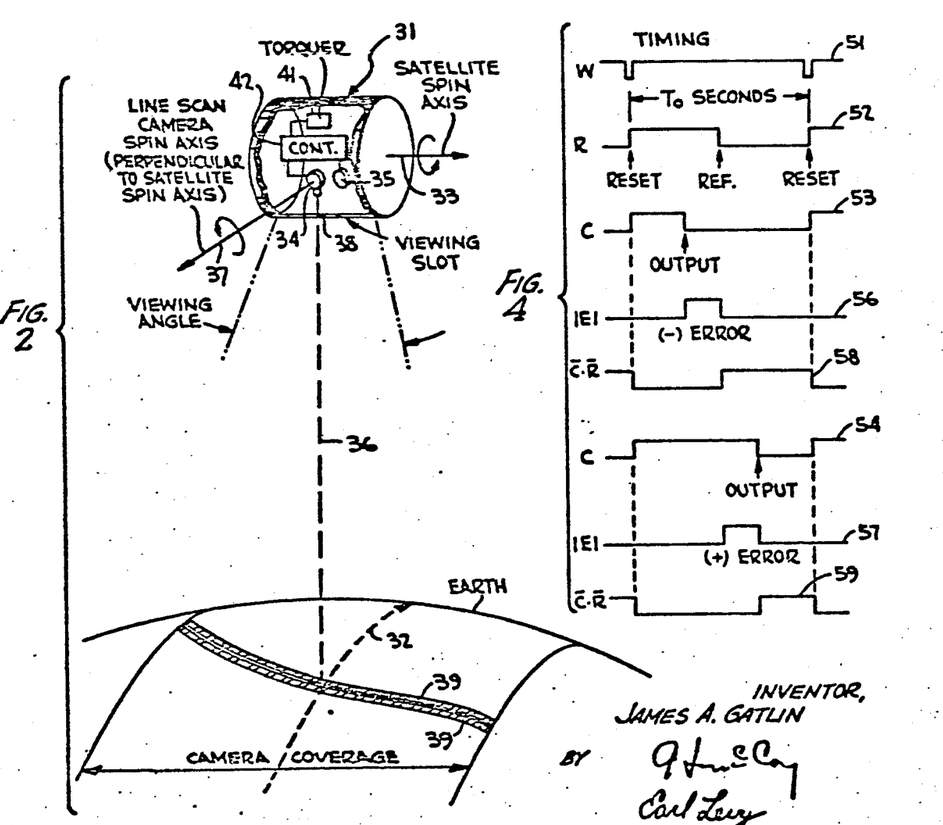
FIG. 2 is a perspective view of a cartwheel satellite stabilized in accordance with the principles of the present invention.
FIG. 4 are waveforms utilized to describe the operation of the system of FIG. 3.

A specific application of the principles of the present invention is provided with a system of the type illustrated by FIG. 2 wherein a cartwheel satellite 31 is illustrated as being in earth orbit, traveling about the earth in a circular orbit and the direction indicated by arrow 32. Stabilization of satellite 31 is provided by spinning the satellite about axis 33, which is maintained normal to the orbital plane of the satellite. Carried on satellite 31 and rotating therewith about axis 33 are camera 34 and horizon photocell detector 35 which derives a positive going leading edge each time the spinning satellite passes the sky-earth horizon, i.e., once for each rotation of satellite 31 about axis 33 at the time when a sky to earth transition is sensed. To enable a relatively large area on earth to be viewed by camera 34, the camera is driven at a constant velocity about axis 37, perpendicular to the satellite spin axis 33, by a synchronous motor (not shown). While camera 34 is driven through complete 360° scans about axis 37 the viewing angle of camera 34 is limited by the length of viewing slot 38 on satellite 31.

Desirably, the rotation of camera 34 about axis 37, the rotation of satellite 31 about axis 33 and the movement of the satellite along the path indicated by line 32 are such that the camera field of view for a pair of successive satellite rotations is defined by the two adjacent, generally parallel and nonoverlapping line scan tracks 39. This result is attained by controlling the attitude of satellite 31 relative to spin axis 33 with a magnetic torquer 41 responsive to controller 42, constructed in accordance with the teachings of the present invention. Controller 42 is responsive to a reference frequency derived from an oscillator driving the synchronous motor for scanning camera 34, as well as indicative of the angular position of a signal of satellite 31 relative to the earth's horizon, derived by photodetector 34. Hence, the reference signal, R, of FIG. 1 is derived from the drive circuitry for camera 34 and the plant 11 output, C, is obtained from photocell 35. Controller 42 responds to the reference drive circuit for camera 34 and the variable output of photocell 35, to drive torquer 41 to phase lock the spin of satellite 31 to the rotation of camera 34 about axis 37 and enable the camera to scan paths indicated by tracks 39.

For a system of the type illustrated by FIG. 2, the response of satellite 31, in its direction of rotation about axis 32 due to forces applied by torquer 41 can be represented as a double integration function, having a response proportional to $1/s^2$, where s is the LaPlace operator. The gain of the plant, including proportionality constants introduced by sample and hold network 16, the response of torquer 41 and the movement of satellite 31 in response to forces developed by the torquer is represented as the constant K. Hence, the response of the entire plant can be accurately represented as $K/2$, if it is assumed that the sample and hold network attenuation factor is a part of the plant. It will be shown infra that the satellite plant of FIG. 2 can be stabilized in three control-signal formulation intervals, each having a 2T-second length, with very low noise sensitivity by utilizing four error sampling periods in each interval, selecting $$K = \left(\frac{1}{2T}\right)^2$$

and picking the weighting coefficients in accordance with ratios related to:

$B_0=\frac{1}{2}$; $B_1=-B_3=-1$; $B_2=-2$; $B_4=3$.

Controller 42, in essence, includes a system for deriving pulse width modulated signals to indicate the position error between the reference and control signals derived from the drive for camera 34 and photocell 35. During each control interval, four pulse width modulated error signals are derived in sequence and weighted in accordance with the proportionality constants, $B_1-B_4$.

During each sample period of the control formulation interval, the oscillator for driving synchronous motor 34 derives wave trains 51 and 52, FIG. 4. Wave train 51 includes a short duration pulse having a leading edge coincident with the beginning of each sample time and a trailing edge, to which other circuits in the system are responsive, that occurs almost immediately after the leading edge. In contrast, wave train 52 is in the form of a square wave, having equal half-cycles during each of the sample times between adjacent pulses in wave train 51. The leading, positive going edge of wave train 52 is synchronized with the leading edge of the short duration pulses of wave train 51 while the leading edge of the negative portion of wave train 52 occurs exactly in the middle of each sample period.

The output of horizon detector 35 is a rectangular pulse width modulated waveform having a leading, positive going edge coincident with the leading edge of reference waveform 52. The trailing edge of the pulse width modulated waveform is indicative of the horizon location and variable about the reference, midpoint of waveform 52. As the position of the horizon varies, as sensed by detector 35, the detector derives variable position pulses to produce variable duration rectangular waves within each of the $n$ sampling periods of each control formulation interval. For a time lag between the output of detector 35 and the reference drive for camera 34, i.e., a negative error, the trailing edge of the variable duration pulse occurs before the midpoint of waveform 52, as indicated by waveform 53; in contrast, for the horizon sensor being positioned ahead of the reference wave driving camera 34, i.e., a positive error, the trailing edge of the variable pulse rectangular wave is subsequent to the reference point of waveform 52, as indicated by waveform 54. For a zero phase error between the reference signal derived from camera 34 and horizon sensing photodetector 35, the photodetector derives an output signal of identical shape and time position as reference waveform 52.

The controller 42 includes circuitry, described infra, for combining reference waveform 52 with the variable duration horizon indicating signals generated by detector 35 to derive variable duration error signals which invariably have a transition coincident with the reference point of waveform 52. For a negative error, the variable duration error indicating signal has a negative going transition, as illustrated by waveform 56, coincident with the center transition of reference wave 52, and a positive going transition coincident with the trailing edge of waveform 53. For a leading positional error between the horizon sensor and the reference drive for camera 34, the error signal is indicated by waveform 57, having a leading edge coincident with the midpoint transition of waveform 52 and a trailing edge coincident with the trailing edge of waveform 54.

For certain control functions it is necessary to indicate when an error cycle has been completed. Such an indication is derived by sensing the leading, positive going transition of a wave train generated in accordance with the logical operation $\overline{C \cdot R}$. For negative and positive errors, therefore, the completion of an error cycle is indicated by waveforms 58 and 59, respectively. In response to the positive transitions of waveform 58 or 59, the system is advised that an error sample has been completed and can be processed.

Figure 3:
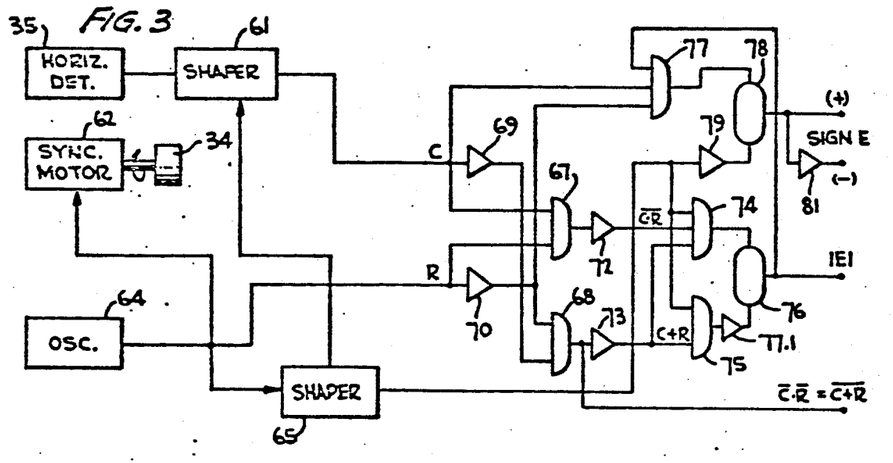
FIG. 3 is a circuit diagram for the error network in the digital controller of the system of FIG. 2.

Exemplary circuitry for deriving the pulse width modulated error indicating signals of FIG. 4 is illustrated by FIG. 3. In normal operation, a single sampling period occurs during each rotation of satellite 31 so that the satellite rotation rate equals a reference frequency derived from oscillator 64 which drives synchronous motor 62. Motor 62 turns camera 34 about axis 37 with the same frequency as is derived by oscillator 64 and detector 35, e.g. 30 r.p.m. To derive variable width position indicating waveform 53, there is provided shaper 61, responsive to the positive going leading edge output of detector 35 and the trailing edge of waveform 51 derived from shaper 65, which is driven by oscillator 64. Shaper 61, which may be a flip-flop, is activated to derive a binary one output in response to the trailing, positive going edge of waveform 51 fed thereto by shaper 65. The output of shaper 61 is maintained at the binary one state until a positive transition is fed to the shaper by detector 35. In response to the output of detector 35 the shaper 61 output returns to the binary zero level until the next sampling period commences, i.e., in response to a positive going transition in the output of shaper 65.

To derive the error signal waveforms 56 and 57, the variable, pulse duration modulated waveform 53 generated by shaper 61 is combined with the oscillator 64 reference waveform 52 in a network including AND gates 67 and 68. AND gate 67 is directly responsive to the variable duration waveform 53 and reference waveform 52, while AND gate 68 is responsive to inverted replicas of these waveforms as derived by inverters 69 and 70. Gate 67 thereby derives a binary output commensurate with $C \cdot R$ while the output of AND gate 68 is represented as $\overline{C} \cdot \overline{R}$, and has a leading edge indicating that an error cycle has been completed. The outputs of gates 67 and 68 are reversed in phase by inverters 72 and 73, respectively, which derive outputs commensurate with $\overline{C \cdot R}$ and $C+R$. The outputs of inverters 72 and 73 are combined with waveform 51, as derived by shaper 65 which is driven by oscillator 64, in AND gates 74 and 75. AND gate 74 feeds the set input of flip-flop 76, while the reset input of flip-flop 76 is a phase inverted replica of the output of AND gate 75, as derived from inverter 77.1. Flip-flop 76 responds to the set and reset inputs thereof to derive one of the variable duration, pulse width modulated error waveforms 56 and 57, FIG. 4, depending upon the error polarity.

The pulse width modulated waveform derived from flip-flop 76, indicative of the positional error of satellite 31 relative to a reference position, is combined with the output of shaper 61 and inverter 70 in AND gate 77 to enable the polarity of the error to be indicated. AND gate 77 derives a binary output signal that feeds the set input of flip-flop 78, the reset input of which is responsive to an inverted replica of the output of shaper 76, as derived by inverter 79. In response to the inputs thereof, flip-flop 78 is set to a state indicative of the sign of the error, at a time coincident with the completion of an error cycle within each sampling period. If the error has a positive value, indicated by a negative transition in the output of flip-flop 76 after the center of reference waveform 52, flip-flop 78 is set to a binary one state during the interval between the completion of the error cycle and the beginning of the next sampling period. The error cycle completion and beginning of the next sampling period are respectively indicated by the leading edge of waveform 59, as derived from AND gate 68, and the trailing edge of the pulses in wave train 51. If the error is negative, flip-flop 78 is set to a zero state in response to the trailing edge of waveform 53 occurring before the negative transition of waveform 52. The flip-flop 78 remains in the binary zero state until the beginning of the next sampling period, indicated by the trailing edge of each pulse in wave train 51.

To reset flip-flop 78 to a zero state at the beginning of each sampling period, the output of shaper 76 is inverted by inverter 79 and applied to the flip-flop reset input. To enable positive voltages indicative of the positive and negative polarities of the error signal to be derived, the output of flip-flop 78 is fed through inverter 81. Thereby, if the output of flip-flop 78 is a binary one at the end of each sampling period, an indication is provided of a positive error signal, while a binary one derived from inverter 81 at the end of each sampling interval indicates a negative error signal.

The circuitry of FIG. 3 performs the function of summing node 15, FIG. 1, since the FIG. 3 circuit derives output signals indicative of the error between a reference input phase of oscillator 64 and the variable position indicating output of detector 35. The variable duration error indicating output signals of FIG. 3 are processed in the circuitry of FIGS. 5 and 6 which perform the functions of switches $19_1, 19_n$, weighting coefficients $B_1...B_n$, summing node 18, serial accumulator 23 and the remainder of the drive circuitry for plant 11. Broadly, the circuitry of FIGS. 5 and 6 responds to the variable duration, pulse width modulated error signals generated by the circuit of FIG. 3 on a time division multiplex basis. Each sampled error signal is multiplied in a single multiplication network by a predetermined weighting factor, depending upon the same period number within the control signal interval. The single multiplication network feeds a counter which functions as the serial accumulator, which drives a digital-to-analog converter, that functions as a sample and hold network and controls the signal amplitude applied to magnetic torquer 41, FIG. 2.

Figure 5:
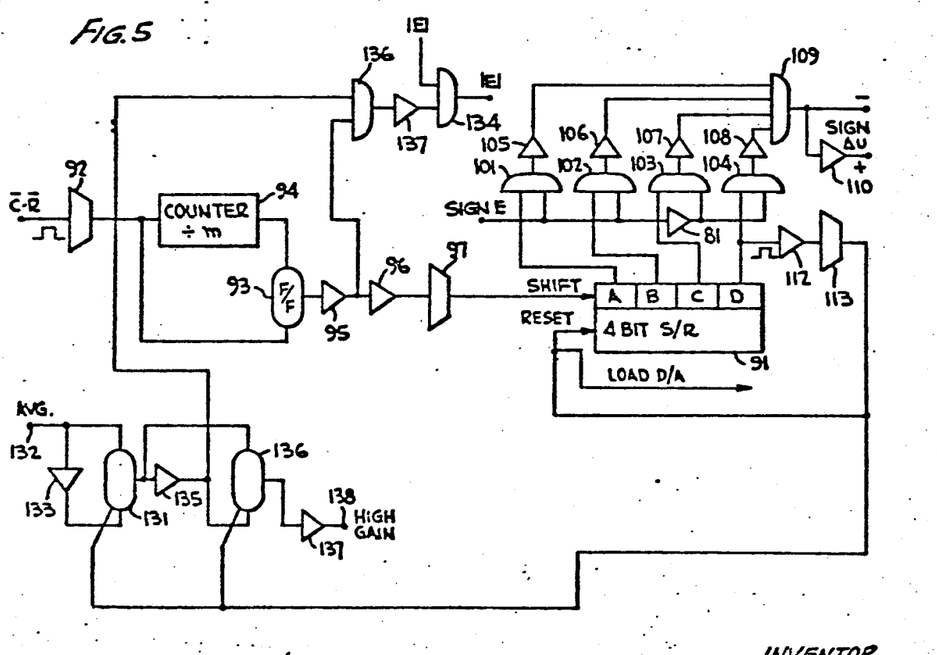
FIG. 5 is a circuit, block diagram of a sequence controller for the controller of FIG. 2.
Figure 6:
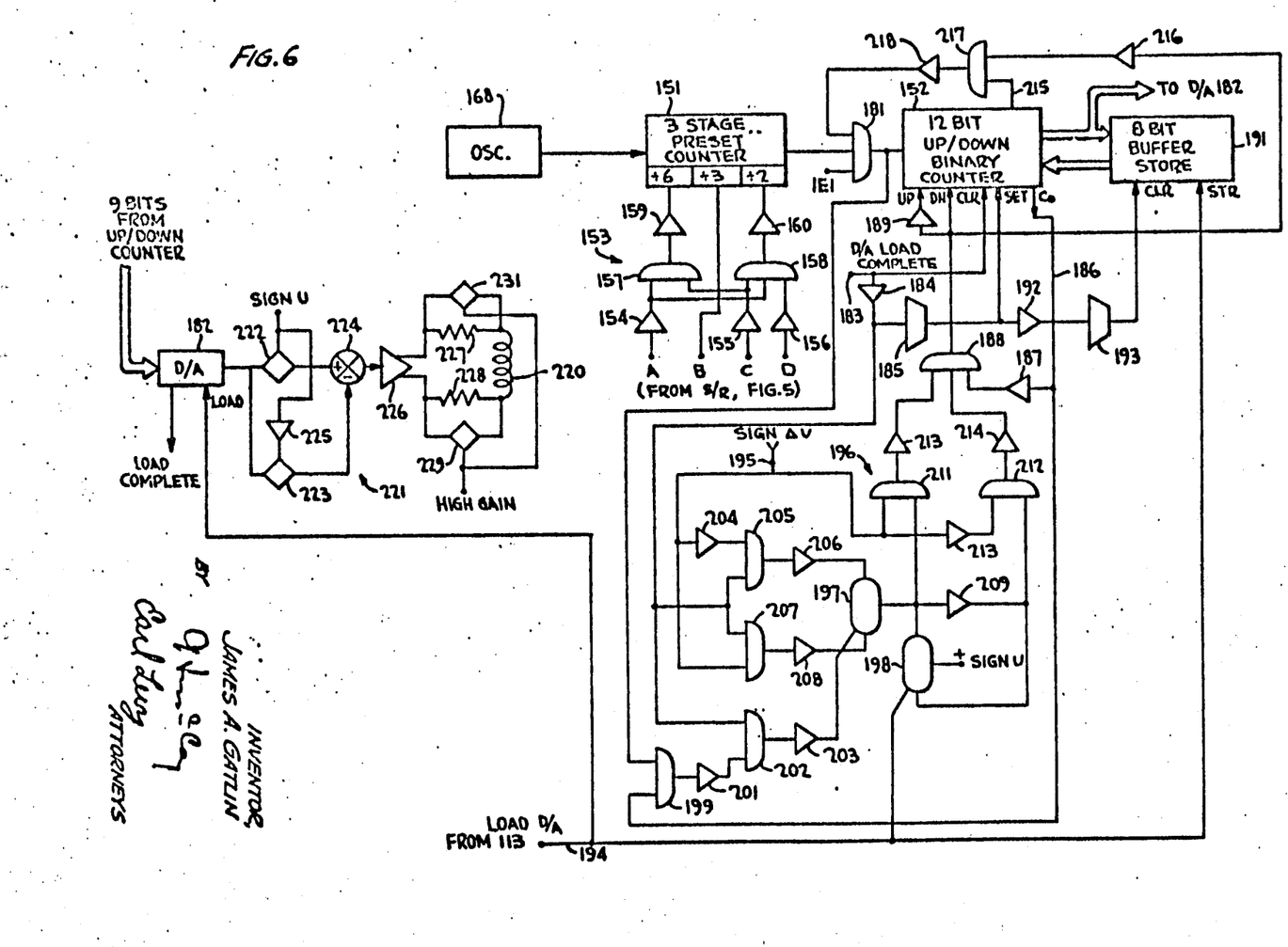
FIG. 6 is a circuit, block diagram of an accumulator and weighting factor network for the FIG. 2 controller.

The circuitry of FIGS. 5 and 6 functions in two sampling modes. In the first mode, when steady state operation of the satellite attitude cannot be presumed but is transient in nature, the positional errors are sampled only once every $m$th error sampling cycle, where $m$ is an integer greater than one. When, however, the system is operating in a steady state mode, each error cycle is sampled during the formulation of each control signal. The difference in the sampling rate is provided to enable a register having a relatively small number of stages to be utilized without reaching saturation, as would occur if all of the error samples were sampled during large transient operation. With the system in a steady state condition, the system loop gain is kept constant by reducing the plant gain to $1/m$ of the value used with it operating in a transient state.

Considering now specifically the circuitry of FIGS. 5 and 6, the sequencer of FIG. 5 includes a 4-bit shift register 91, with one stage of the shift register being provided for each of the sampling periods within a control-signal formulation interval. At the end of each of the four sampling periods, within a control formulation interval, shift register 91 is supplied with a shift pulse. To this end, the output of AND gate 68, FIG. 3, having a leading edge occurring upon the completion of an error cycle, is fed through differentiator 92 to the reset input of flip-flop 93, and through divide by $m$ frequency dividing counter 94 to the set input of flip-flop 93. Thereby, flip-flop 93 is reset once every $m$ error cycles of the FIG. 3 circuitry. The output of flip-flop 93 is fed through cascaded inverters 95 and 96 to differentiator 97 which feeds a shift input into register 91 in response to each positive transition of flip-flop 93 from the reset to the set state.

As shift register 91 is stepped between its various stages, a binary one output is derived from the activated stage. The output of each of the four shift register stages, A—D, is applied to the input of a different one of AND gates 101—104. AND gates 101—104 are also responsive to a signal indicative of the sign or polarity of the error signal, derived from flip-flop 78, FIG. 3. Gates 101 and 102 are responsive to the sign or polarity indication of the error signal directly, while gates 103 and 104 are responsive to an inverted replica of the error signal polarity, as coupled through inverter 81. Each of AND gates 101—104 drives a separate inverter 105—108, the outputs of which are combined in AND gate 109. AND gate 109 derives a binary signal indicative of the polarity of the change in the control signal being formed resulting from the sample being processed that is applied to inverter 110. If the output of inverter 110 is a binary one signal, an indication is provided that the polarity of the control signal change is positive, while a binary zero level output of the inverter indicates a negative change in the control signal. The error signal sign or polarity indicating signal feeding gates 101—104 is interrelated with the signals derived from the stages A—D of shift register 91 in accordance with the polarity of the $B_1...B_4$ weighting factors. Hence, for the $B_1$ and $B_2$ positive weighting factors, the error signal polarity indicating signal is applied directly to AND gates 101 and 102, while for the negative $B_3$ and $B_4$ weighting factors, an inverted replica of the error signal polarity indicating signal is applied to AND gates 103 and 104.

To reset flip-flop 91 after a control interval has been completed, as indicated by the shift register D stage switching from an activated to a deactivated state, the D state output is coupled through inverter 112 to differentiator 113. Differentiator 113 responds to the output of inverter 112 to derive a binary one output for a predetermined time interval after the trailing edge of the D stage of the shift register has been completed. The output of differentiator 113 is coupled to the reset input of shift register 91. Thereby, shift register 91 is reset to the A stage after the D stage thereof has been deactivated. Differentiator 113 also drives a load input terminal of a digital-to-analog converter, described infra in conjunction with FIG. 6. Thereby the digital-to-analog converter is responsive to a new input signal simultaneously with shift register 91 having its A stage activated.

To control the rate at which error signals are supplied from the circuit of FIG. 3 to the circuit of FIG. 6, as well as the gain of circuitry controlling magnetic torquer 41, flip-flop 131 is provided. Flip-flop 131 is of the master-slave or J-K type, whereby set and reset signals are transferred to an output terminal only in response to a trigger signal being developed. The output terminal signals are maintained until the next trigger signal is fed to the flip-flop.

Flip-flop 131 is responsive to a binary signal on terminal 132, indicative of the desired rate at which error samples are to be taken. The binary signal on lead 132 is derived at will, or can be derived automatically in response to system variables, so that with the system operating in a steady state condition, every error sample is taken; with the system operating in a transient mode, however, only one out of every $m$ error samples is utilized. For the high sampling rate a binary one signal is coupled to terminal 132, while a binary zero is fed to the terminal for the slower sampling rate. The binary signal coupled to terminal 132 is fed directly to the set input of flip-flop 131 while the reset input of the flip-flop is responsive to an inverted replica of the signal at terminal 132, as coupled through inverter 133. The output of flip-flop 131 is fed to AND gate 134 through inverter 135, AND gate 136 and inverter 137. AND gate 134 is also responsive to the error indicating output signal of flip-flop 76, FIG. 3. Thereby, the output of AND gate 134 is an exact replica of the error indicating signal derived from flip-flop 76 whenever flip-flop 131 is activated to the set state. Flip-flop 131 is triggered into the set state at the end of each sampling period defined by shift register 91, in response to the trailing edge of the shift register D state output, as coupled through inverter 112 and differentiator 113.

With flip-flop 131 in a binary zero state, only one out of every $m$ error samples is coupled through AND gate 134. This occurs because AND gate 134 is responsive to the output of AND gate 136, having an input fed by inverter 95, as well as inverter 135. With a binary zero state derived from flip-flop 131, a binary one can be derived from inverter 137 only in response to flip-flop 93 being in a binary one state. The binary one state is derived from flip-flop 93, however, at a frequency of $1/m$ of the sampling rate for the error signal because of counter 94.

As the error sampling rate changes, it is also necessary to change the gain for the drive circuit of the satellite magnetic torquer 41. For a high sampling rate, the gain of the torquer drive circuit should be less than for a slow error sampling rate.

To synchronize the gain for the magnetic torquer 41 with the sampling rate for the error signal derived by FIG. 3, J-K flip-flop 136 is provided. The set input of flip-flop 136 is directly responsive to the output of flip-flop 131, while the reset input of flip-flop 136 is an inverted replica of the flip-flop 131 output, as derived by inverter circuit 135. Flip-flop 136 is triggered in parallel with flip-flop 131, and thereby is responsive to negative going transitions derived from stage D of shift register 91. The output of flip-flop 136 is coupled through inverter 137 to terminal 138, which has an output corresponding with the output of inverter 135, but delayed therefrom by the time it takes shift register 91 to cycle through activations of stage D between adjacent control signal intervals. The delay interposed between the outputs of inverters 135 and 137 is introduced because the sampling error output of AND gate 134 is not fed into magnetic torquer 41 by the circuitry of FIG. 6 until after the next complete activation cycle of shift register 91.

Consideration is now given to the circuit diagram of FIG. 6. In FIG. 6, the weighting coefficient networks $17_1$—$17_n$ of FIG. 1 are replaced with three-stage preset counter 151, while 12-bit up-down binary counter 152 performs the function of serial accumulator 23. Counter 152 responds to the variable duration error samples derived from the output of AND gate 134 at a rate dependent upon the preset count stored in counter 151. To this end, the frequency division factor of counter 151 on a constant or reference frequency fed thereto from pulse oscillator 168 (typically having a frequency of 1200 Hz. for a 30 r.p.m. rotation rate of satellite 13) is determined by stages A—D of shift register 91, FIG. 5.

Stages A—D of shift register 91 are interconnected with the stages of counter 151 by logic network 153 to introduce the desired frequency division or weighting factors for the four different sampling intervals within a complete control signal interval. For the first and third sampling periods the frequency division factors are both one-sixth, while for the second and fourth periods, the factors are one-third and one-half, respectively. This selection establishes the desired weighting factor proportionality factor ratios corresponding with $$|B_1|=|B_3|=1, |B_2|=2, |B_4|=3$$

To establish the desired frequency division factors for the different sampling periods, network 153 includes a direct connection to the second stage of counter 151 from stage B of shift register 91. This connection introduces a divide by three frequency division factor on the reference frequency signal applied to the input of the counter for the second sampling period. Since the $B_1$ and $B_3$ weighting factors are one-half that of the $B_2$ weighting factor, the frequency division introduced in response to shift register 91 being set to stages A and C is six. To establish the divide by six factor, the A and C stage outputs of register 91 are fed to inverter gates 154 and 155, respectively. The outputs of gates 154 and 155 are applied to AND gates 157 and 158, which feed the first and third stages of counter 151 through inverter 159 and 160, respectively. In response to the first and third stages of counter 151 being set, the counter introduces a divide by six frequency division factor on the input signal thereof. To introduce a divide by two frequency division factor on the input of counter 151, commensurate with the $B_4$ weighting factor, the output of stage D of register 91 is coupled through inverter 156 to AND gate 158, which drives the first stage of counter 151 through inverter 160.

Counter 151 thereby generates a clock rate inversely proportional to the B weighting factor of a particular sampling period. Because the clock rate derived by counter 151 during any sampling period is inversely proportional to the weighting factor for that interval and the error signal magnitude for the period is proportional to the width of a rectangular wave form, multiplication of the error signal and weighting factor can be performed by performing a logic AND operation. To this end, the weighting factor indicating output of counter 151 is combined with the error indicating output of flip-flop 76, FIG. 3, in AND GATE 181, having a further output which is normally maintained at a binary one state as seen infra. The output of AND gate 181, a signal having a number of pulses within each sampling period equal to the produce BE, is applied to the input of 12-bit up-down binary counter 152.

Counter 152 includes four control input terminals for: clearing the counter to a zero state; enabling the counter to be set; increasing the stored count in response to each output pulse of AND gate 181; and reducing the stored count in response to each output pulse of AND gate 181. The counter 152 includes a control output terminal to indicate when it is in a zero state, as well as a control output terminal to indicate when it has reached the maximum count which it is capable of storing, a counter saturation condition.

Binary counter 152 is cleared to a zero state after each control signal interval has been completed. An indication of a control signal interval having been completed is derived on lead 180 by digital-to-analog converter 182 after the converter has been driven with the nine least significant output bits of counter 152. The load complete output signal of converter 182 is fed to terminal 183 and applied directly to the clear input terminal of binary counter 152. The load complete signal on terminal 183 is also applied through inverter 185 to differentiator 185, the output of which feeds the counter 152 set input terminal. Differentiator 185 thereby feeds a constant duration, positive pulse into the counter set input terminal after the clear control voltage has been removed from counter 152 and the counter is in the cleared state.

Counter 152 is now in a zero state, whereby a binary one signal is derived therefrom on lead 186. The binary one signal on lead 186 is applied as an enable signal to the UP input terminal of up-down binary counter 152 via inverter 187, AND gate 188 and inverter 189. Immediately after counter 152 is activated to the UP count state, a clear input signal is supplied to 8-bit buffer storage register 191 via inverter 192 and differentiator 193, with the inverter being driven in response to the output of differentiator 185. 8-bit buffer storage register 191 is selectively connected to the second through ninth stages of counter 152 in response to the load digital-to-analog converter control signal occurring at the end of each control signal interval coupled to lead 194 from inverter 116, FIG. 5.

Simultaneously with the contents of the second through ninth stages of counter 152 being gated into register 191, digital-to-analog converter 182 is fed with nine bits from the least nine significant stages (stages one to nine) of counter 152 in response to the load digital-to-analog converter signal on lead 194. Thereby, upon completion of a control signal interval, converter 182 is fed with an indication of the control signal value, U, and register 191 stores a binary signal which can be equated with U/2 after appropriate processing. It is only necessary to feed the nine least significant bits of counter 152 to register 191 and converter 182 because the value of U at the end of a control signal interval never exceeds that magnitude, but it may be greater than that magnitude prior to completion of the interval necessitating the use of 12-bit counter 152.

The signal stored in register 191 is fed back to the least eight significant bit stages of counter 152 after digital-to-analog converter 182 derives its load complete signal to effectively shift its value to the right one place and cause a U/2 signal to be derived. To this end, the stages of register 191 are selectively connected to the first eight stages of counter 152 to load these counters. Coupling between the output of register 191 and the least eight significant bit stages of counter 152 is in response to the output of differentiator 193, driven by inverter 192 which is in turn responsive to the output of differentiator 185. Counter 152 is thereby set to a signal indicative of the control signal magnitude for the previous control signal interval divided by two prior to any error signals being fed thereto, i.e., prior to the initiation of the first sampling period during the next control signal interval.

Once 12-bit up-down binary counter 152 has been loaded with the control signal derived from the previous control signal interval $U_s/2$, the first sampling period of the next control signal interval is initiated. It is to be recalled that during the first sampling interval, stage A of shift register 91 is activated, whereby the output of AND gate 109 is indicative of the polarity of the incremental change in the value of the control signal due to the first sample. The output of gate 109 is fed to the UP and DOWN input control terminals of counter 152 via terminal 195 and logic network 196.

It is broadly the function of logic network 196 to compare the sign or polarity of the incremental change in the value of the control signal, as fed to terminal 195, with the polarity of the value of U stored in counter 152 to derive up-down command signals for the counter. To store values indicative of the sign of U, network 196 includes a pair of J-K flip-flops 197 and 198 for deriving signals respectively indicative of the polarity of the value of U currently in counter 152 and at the end of the previous control signal interval. Flip-flop 197 is triggered only in response to counter 152 going through a zero count at a time other than while the digital-to-analog load complete circuit is being derived by converter 182. To this end, the zero count indicating output lead 186 of counter 152 is coupled to the trigger input of flip-flop 197 via AND gate 199, which is enabled in response to the output of AND gate 181 only while an error signal is being coupled through AND gate 181. The output signal of AND gate 199 is fed through inverter 201 to an input terminal of AND gate 202, the other input of which is enabled at all times except while a digital-to-analog load complete signal is being applied by differentiator 113, FIG. 5, to terminal 183, by virtue of the connection of AND gate 202 to the output of inverter 184.

The output of AND gate 202 is fed through inverter 203 to the trigger input of flip-flop 197, having set and reset inputs respectively responsive to positive and negative polarity indications of the change in the value of U, as coupled to terminal 195. The signal coupled to terminal 195 is fed to the set input terminal of flip-flop 197 via inverter 204 and AND gate 205, the other input of which is enabled at all times except while the digital-to-analog load complete signal is being coupled to terminal 183 by virtue of the connection of the other input of AND gate 205 to the output of inverter 184. The reset input of flip-flop 197 is responsive to negative polarity indications of the change in the value of U ($\Delta U$) for the sample being considered by coupling the signal at terminal 195 through AND gate 207 and inverter 208 to the flip-flop reset input. AND gate 207 is enabled simultaneously with AND gate 205 because of its connection to the output of inverter 184.

Because flip-flop 197 is triggered in response to changes in polarity of the value of U stored in counter 152 when the counter goes through a zero, it effectively stores the polarity of the value of U at the end of a complete control signal interval. This value is transferred to flip-flop 198 while digital-to-analog converter 182 is being loaded in response to the output signal of inverter 116, FIG. 5. To this end, the output signal of inverter 116 is coupled via lead 194 to the trigger input of flip-flop 198, having set and reset inputs responsive to the output of flip-flop 197. The set input of flip-flop 198 is directly connected to the output of flip-flop 197, while the reset input of flip-flop 198 is responsive to an inverted replica of the flip-flop output, as coupled through inverter 209.

The sign of $\Delta U$ for the currently processed sampling interval is combined with the sign of $\Delta U$ signal for the just previously handled sampling interval in a network of inverter and AND gates to drive the up-down control input terminals of counter 152. To this end, the $\Delta U$ signal at terminal 195 is combined with the $\Delta U$ output of flip-flop 197 in AND gate 211, while inverted replicas of the signals at terminal 195 and the output of flip-flop 197 are fed to AND gate 212 via inverters 213 and 209, respectively. The outputs of AND gates 211 and 212 are fed through inverters 213 and 214, respectively, to inputs of AND gate 181, which drives the UP and DOWN input control terminals of counter 152, as described supra.

To consider an exemplary case as to the manner by which counter 152 functions, assume that the polarity of the produce of the error weighting coefficient for the first sample is positive and the value of U for the previously completed control signal interval is negative. For such a situation, counter 152 should be activated to a countdown mode because of the opposite polarities of the two signals consecutively applied thereto. To achieve this result, a binary one signal is applied to terminal 195 to enable AND gate 211 and disable AND gate 212. While the binary one $\Delta U$ signal is fed from terminal 195 to AND gate 211, flip-flop 197 derives a binary zero output, to indicate the minus value of U at the end of the previous control signal interval. The binary one signal at terminal 195 and the binary zero output of flip-flop 197 result in a binary zero being derived from the output of AND gate 211. Since AND gate 212 is deriving a binary zero signal and inverter 187 is deriving a binary one signal while a binary zero is being derived from AND gate 211, a binary one output is generated by AND gate 188 to activate counter 152 to the countdown state.

One further feature of the circuitry associated with counter 152 is that the count is maintained at the maximum level, once saturation has been reached until a countdown control signal is derived. To this end, the counter includes an output lead 215 on which there is derived a binary one value as long as the counter has not reached maximum count. The signal on lead 215 is combined with the output of AND gate 188, as coupled through inverter 215, in AND gate 217. The output of AND gate 217 is fed through inverter 218 to an input of AND gate 181. Thereby, inverter 218 derives a binary one signal to enable AND gate 181 as long as countersaturation has not been reached. With countersaturation having been reached, a binary zero if derived from the output of inverter 218 to decouple counter 152 from the error signals normally fed through the AND gate. Counter 152 remains decoupled from the error signals until a down count indicating signal is derived as a binary one output of AND gate 188. In response to a down count command signal being supplied to counter 152, the counter will be removed from a saturated state and therefore error signals from gate 181 should be applied thereto. The connections between the output of AND gate 188 through inverter 215, AND gate 217 and inverter 218 to the input of AND gate 181 provide this result.

To control magnetic torquer 41 in response to the magnitude of the control signal periodically derived from counter 152, single quadrant digital-to-analog converter 182, which functions similarly to sample and hold network 16, is provided. Converter 182 is loaded with the nine least significant bits of converter 152 at the end of each control signal interval in response to the load digital-to-analog converter signal derived by differentiator 113, FIG. 5. After the output of counter 152 has been loaded into converter 182 and the converter is deriving an output signal commensurate therewith, the converter generates a load complete signal on lead 180 to initiate a new control signal interval.

The analog output of converter 182 feeds coil 220 of magnetic torquer 41 through network 221. Network 221 includes switches 222 and 223 responsive to the periodically changed output of digital-to-analog converter 182. Switches 222 and 223 are responsive to the polarity of U indication derived from flip-flop 198 to control the polarity of the analog input to coil 220 of magnetic torquer 41. In response to a positive indication, stored in flip-flop 198, for the sign of U for the previously completed control signal interval being indicative, switch 222 is closed to gate the output of converter 182 to a plus input terminal of difference network 224. In response to a negative value for the sign of U, switch 222 is closed, while switch 223 is opened in response to the output of inverter 225, which is driven by the flip-flop 198 output. The signal fed through switch 223 is coupled to a minus input terminal of difference network 224.

Difference network 224 thereby derives a constant amplitude signal having a value of U over each control signal interval. The polarity of the signal generated by difference network 224 is appropriately controlled even though a single quadrant digital-to-analog converter 182 is provided. The output of difference network 224 is fed to coil 225 of magnetic torquer 41 via power amplifier 226, having a voltage gain of one. The signal derived from power amplifier 226 is selectively attenuated by resistors 227 and 228 depending upon the gain of the system, as derived at terminal 138, FIG. 5. For a high gain, with the system operating in a transient condition, the output of amplifier 226 is coupled directly to coil 225 by shunting resistors 227 and 228. To this end, switches 229 and 231 are connected in parallel with resistors 227 and 228, respectively. Switches 229 and 231 are driven in parallel with the high gain signal fed to terminal 138, whereby the switches are closed in response to the high gain signal having a binary one value. For low gain, as desired in the steady state operating mode, a binary zero is fed to control input terminals of switches 229 and 231 through terminal 138 to insert resistors 227 and 228 into the circuit.

Consideration will now be given to the technique for deriving the values $B_0$—$B_4$ for the system of FIG. 2, which can be represented as a plant described by double integration, as indicated supra. Before considering the specific manner by which the coefficients $B_0$—$B_4$ are derived for a controller having four sampling periods within each control signal interval, consideration will be given to the technique for finding the coefficients $B_0$, $B_1$ and $B_2$ for a controller having only two sampling periods.

If a control signal of constant value is applied to a plant described by double integration for a period of 2T seconds, the velocity and position of the plant 2T seconds after the control signal was applied thereto can be represented as:

$$\omega_{2T} = \omega_0 + U \int_0^{2T} K dt \quad (2)$$

$$\theta_{2T} = \theta_0 + \int_0^{2T} \left(\omega_0 + U_0 \int_0^t K d\tau\right) dt \quad (3)$$

where:
$\omega_{2T}$ and $\theta_{2T}$ are respectively the velocity and position of the plant at the time being considered;
$\omega_0$ and $\theta_0$ are respectively the initial velocity and position of the plant;
$t=$ time;
$U=$ the value of the control signal;
$U_0=$ the initial value of the control signal;
$\tau=$ a dummy integration variable; and
$K=$ system gain as defined supra.

Integrating, assuming constant values over the interval, multiplying Equation (2) by T, and simplifying yields:

$$T\omega_{2T} = T\omega_0 + (2KT^2) U_0 \quad (4)$$

$$\theta_{2T} = 2T\omega_0 + \theta_0 + 2(2KT^2)U_0 \quad (5)$$

Letting $G=Kt^2$ and adding the control law:

$$U_{2T} = (a_{31})T\omega_0 + (a_{32})\theta_0 + (a_{33})U_0 \quad (6),$$

where $a_{31}$, $a_{32}$ and $a_{33}$ are state feedback coefficients, then yields the closed-loop-system coefficient matrix defined as $$\begin{bmatrix} T\omega_{2T} \\ \theta_{2T} \\ U_{2T} \end{bmatrix} = \begin{bmatrix} 1 & 0 & 2G \\ 2 & 1 & 2G \\ a_{31} & a_{32} & a_{33} \end{bmatrix} \begin{bmatrix} T\omega_0 \\ \theta_0 \\ U_0 \end{bmatrix} = A \begin{bmatrix} T\omega_0 \\ \theta_0 \\ U_0 \end{bmatrix} \quad (7)$$

where A is the matrix defining the system response at the instant of the Equation (6) control-law update to any set of initial conditions. The output state, q2T seconds, where q is an integer, after a given set of initial conditions, is $$\begin{bmatrix} T\omega_{q2T} \\ \theta_{q2T} \\ U_{q2T} \end{bmatrix} = A^q \begin{bmatrix} T\omega_0 \\ \theta_0 \\ U_0 \end{bmatrix} \quad (8)$$

Therefore, if the controller parameters ($a_{31}$, $a_{32}$, $a_{33}$ and G) can be chosen so that $A^3$ has all zero elements, then any initial state vector will be reduced to zero after these control-law updates.

The parameters G and $a_{33}$ are not independent, as can be seen by letting $a_{33}<0$ and rewriting Equation (7) as:

$$\begin{bmatrix} T\omega_{2T} \\ \theta_{2T} \\ \frac{U_{2T}}{|a_{33}|} \end{bmatrix} = \begin{bmatrix} 1 & 0 & 2G|a_{33}| \\ 2 & 1 & 2G|a_{33}| \\ \frac{a_{31}}{|a_{33}|} & -1 & a_{33} \end{bmatrix} \begin{bmatrix} T\omega_0 \\ \theta_0 \\ \frac{U_0}{|a_{33}|} \end{bmatrix} \quad (9)$$

Thus, without loss of generality $a_{33}$ can be made equal to $-1$ for unity feedback of the output $\theta$, with G left as a free parameter. Now, using $$A = \begin{bmatrix} 1 & 0 & 2G \\ 2 & 1 & 2G \\ a_{31} & -1 & a_{33} \end{bmatrix} \quad (10)$$

and $$A^2 = \begin{bmatrix} 1+2a_{31}G & -2G & (1+a_{33})2G \\ 4+2a_{31}G & 1-2G & (3+a_{33})2G \\ (1+a_{33})a_{31}-2 & -(1+a_{33}) & (a_{31}-1)2G+(a_{33})^2 \end{bmatrix} \quad (11)$$

consider the system response to an initial output displacement which is $$A\begin{bmatrix} 0 \\ 1 \\ 0 \end{bmatrix} = A^2 \begin{bmatrix} 0 \\ 1 \\ -1 \end{bmatrix} = \begin{bmatrix} (2+a_{33})2G \\ 1-(4+a_{33})2G \\ (1-a_{31})2G-1-(1+a_{33})a_{33} \end{bmatrix} \quad (12)$$

A necessary condition for finite settling time response is that $$A^3 \begin{bmatrix} 0 \\ 1 \\ 0 \end{bmatrix} = \begin{bmatrix} 0 \\ 0 \\ 0 \end{bmatrix} \quad (13)$$

which yields the set of equations
$2 + a_{33} = 0$
$2G = 1/(4+a_{33}) \quad (14)$
$(1-a_{31})2G = 1 + (1+a_{33})a_{33}$
that is satisfied by the state feedback coefficients
$a_{31} = 5,$
$a_{32} = 1, \quad (15)$
$a_{33} = -2$
and
$G = \frac{1}{4}$.

When these values are substituted in Equations (10) and (11), they become $$A = \begin{bmatrix} 1 & 0 & \frac{1}{2} \\ 2 & 1 & \frac{1}{2} \\ -5 & -1 & -2 \end{bmatrix} \quad (16)$$

and $$A^2 = \begin{bmatrix} -\frac{3}{2} & -\frac{1}{2} & -\frac{1}{2} \\ \frac{3}{2} & \frac{1}{2} & \frac{1}{2} \\ 3 & 1 & 1 \end{bmatrix} \quad (17)$$

respectively.

Calculating $A^3$ shows that all the elements of $A^3$ are zero; therefore, Equation (13) is sufficient as well as necessary for finite settling time response. A similar development for a more general second-order plant has been carried out and is reported in the PhD. thesis of James A. Gatlin, University of Maryland, College Park, Maryland, 1968.

Control-law synthesis involves selecting the weighting factors $B_0,...,B_n$ so as to make Equations (1) and (6) identical. Using plant model given by Equations (2) and (3), the calculated values of $\theta_1,...,\theta_n$ during a 2T-second interval are $$\theta_1 = \theta_0 + 2\left(\frac{1}{n}\right)T\omega_0 + \frac{1}{2}\left[2\left(\frac{1}{n}\right)T\right]^2 KU_0$$

$$\vdots$$

$$\theta_{n-1} = \theta_0 + 2\left(\frac{n-1}{n}\right)T\omega_0 + \frac{1}{2}\left[2\left(\frac{n-1}{n}\right)T\right]^2 KU_0$$

$$\theta_n = \theta_0 + 2T\omega_0 + \frac{1}{2}[2T]^2 KU_0 \quad (18)$$

Multiplying by the appropriate weighting factors and adding yields the control-law matrix elements $$-a_{31} = \frac{2}{n}[nB_n + (n-1)B_{n-1} + \cdots + B_1]$$

$$-a_{32} = B_n + B_{n-1} + \cdots + B_1 \quad (19),$$

$$-a_{33} = B_0 + \gamma_3 G$$

with, by definition, $$G = KT^2 \quad (20)(20)$$

and $$\gamma_3 = \frac{2}{n^2}[n^2 B_n + (n-1)^2 B_{n-1} + \cdots + (1)^2 B_1] \quad (21)$$

Thus, for a given $n$, Equation (19) can be solved for the weighting factors that produce the finite settling time matrix parameters.

At least two samples must be taken; for $n=2$, $G=\frac{1}{4}$, Equations (19) become $$\begin{bmatrix}-a_{31} \\ -a_{32} \\ -a_{33}\end{bmatrix} = \begin{bmatrix}0 & 1 & 2 \\ 0 & 1 & 1 \\ 1 & \frac{1}{8} & \frac{1}{2}\end{bmatrix}\begin{bmatrix}B_0 \\ B_1 \\ B_2\end{bmatrix} \quad (22)$$

which has the inverse $$\begin{bmatrix}B_0 \\ B_1 \\ B_2\end{bmatrix} = \begin{bmatrix}-\frac{1}{2} & \frac{1}{4} & 1 \\ -1 & 2 & 0 \\ 1 & -1 & 0\end{bmatrix}\begin{bmatrix}-a_{31} \\ -a_{32} \\ -a_{33}\end{bmatrix} \quad (23)$$

to yield $B_0 = +\frac{1}{2}$, $B_1 = -3$ and $B_2 = 4$ so that the resulting finite settling time control-law formulation is $$-U_{zT} = 4\theta_2/3\theta_1 + \frac{1}{2}U_0 \quad (24).$$

The control-law variance factor, $F$, a measure of noise sensitivity, is defined as $$F = \sum_{i=1}^{n}(B_i)^2 \geq \sigma_U^2/\sigma_e^2 \quad (25)$$

where $\sigma_U^2$ is the variance of the control signal, $U$, and $\sigma_e^2$ is the variance of the output samples.

For the control formulation of Equation (24), $$F = (4)^2(3)^2 = 25 \quad (26).$$

When three or more samples are taken, $B_0$ can be left as a free parameter and used to minimize $F$ after the control law has been formulated. This involves replacing $a_{33}$ in Equation (19) by $$\gamma_3 = -\frac{(a_{33} + B_0)}{G} = 4(2 - B_0) \quad (27)$$

as one of the FST matrix parameters; then, for three samples, $n=3$, $$\begin{bmatrix}-3a_{31} \\ -a_{32} \\ 9\gamma_3\end{bmatrix} = \begin{bmatrix}2 & 4 & 6 \\ 1 & 1 & 1 \\ 1 & 4 & 9\end{bmatrix}\begin{bmatrix}B_1 \\ B_2 \\ B_3\end{bmatrix} \quad (28)$$

which has the inverse $$\begin{bmatrix}B_1 \\ B_2 \\ B_3\end{bmatrix} = \frac{1}{4}\begin{bmatrix}-5 & 12 & 2 \\ 8 & -12 & 4 \\ -3 & 4 & 2\end{bmatrix}\begin{bmatrix}-3a_{31} \\ -a_{32} \\ 36(2-B_0)\end{bmatrix} \quad (29)$$

The FST control-law formulation that results is $$-U_{zT} = B_3\theta_3 + B_2\theta_2 + B_1\theta_1 + B_0 U_0 \quad (30),$$

with $$4B_1 = 9(1-4B_0),$$
$$4B_2 = -36(1-2B_0),$$
$$4B_3 = 31-36B_0;$$

for which the control-law variance factor is $$16F = 81(1-4B_0)^2 + 1296(1-2B_0)^2 + (31-36B_0)^2 \quad (31).$$

Solving for the $B_0$ giving minimum $F$ yields $$0 = 162(1-4B_0) + 1296(1-2B_0) + 18(31-36B_0) \quad (32),$$

$$(B_0)_{OPT} = 2016/1944 = 0.5185$$

which produces the weighting factors $$B_1 = -2.417,$$
$$B_2 = 0.333, \quad (33),$$
$$B_3 = 3.083,$$

and, for 3 samples, $F_{min} = 15.5$.

It is interesting to compare these results with the weighting factors required for the finite settling time response when $B_0 = 0$. Equations (30) then yield $$B_1 = 2.25,$$
$$B_2 = -9 \quad (34)$$
$$B_3 = 7.75,$$

and $$F = 145;$$

thus, memory of the previous control level is very effective in reducing the control-law variance factor and noise sensitivity.

When four samples are taken, Equations (19) become $$-a_{31} = \frac{1}{2}[4B_4 + 3B_3 + 2B_2 + B_1],$$
$$-a_{32} = B_4 + B_3 + B_2 + B_1, \quad (35)$$
$$8\gamma_3 = 16B_4 + 9B_3 + 4B_2 + B_1.$$

One way to handle four samples and provide the easily implemented coefficients utilized in the system described in conjunction with FIGS. 2—6 is to use the constraint relationship $$B_1 = -B_3 \quad (36)$$

so that Equations (35) reduce to $$\begin{bmatrix}-a_{31} \\ -a_{32} \\ 2\lambda 3\end{bmatrix} = \begin{bmatrix}1 & 1 & 2 \\ 1 & 0 & 1 \\ 1 & 2 & 4\end{bmatrix}\begin{bmatrix}B_2 \\ B_3 \\ B_4\end{bmatrix} \quad (37)$$

which has an inverse and yields, as the required set of FST weighting factors, $$\begin{bmatrix}B_2 \\ B_3 \\ B_4\end{bmatrix} = \begin{bmatrix}2 & 0 & -1 \\ 3 & -2 & -1 \\ -2 & 1 & 1\end{bmatrix}\begin{bmatrix}5 \\ 1 \\ 8(2-B_0)\end{bmatrix} = \begin{bmatrix}-6+8B_0 \\ -3+8B_0 \\ 7-8B_0\end{bmatrix} \quad (38)$$

Letting $B_0 = \frac{1}{2}$ yields the following FST control-law formulation:

$$-U_{zT} = 3\theta_4 + 2\theta_3 - \theta_2 - \theta_1 + \frac{1}{2}U_0 \quad (39)$$

with $$F = (3)^2(1)^2 + (2)^2 + (1)^2 = 15.$$

The value of $F$ is only 30 percent greater than the absolute minimum as derived in the previously mentioned Thesis so that the system of FIGS. 2—6 has relatively low noise sensitivity and finite settling time within two 2T control signal formulation intervals.

While there has been described and illustrated one specific embodiment of the invention, it will be clear that variations of the details of construction which are specifically illustrated and described may be made without departing from the true spirit and scope of the invention as defined in the appended claims.

For example, the invention can be used to provide despin control of a dual spin satellite wherein a motor is used to counterrotate a platform on a satellite but rotatable to it. In such an example it is desired to maintain the position of the platform aligned with the horizon as detected by a horizon sensor on the rotatable portion of the satellite. The output of the sensor, a pulse train similar to that of horizon detector 35, is compared with a reference frequency in a network as illustrated for the cartwheel satellite to control the platform to the aligned position.

I claim:

1. A sampled data controller for a plant having a known input vs. output response, said controller being responsive to a reference input, comprising means responsive to the plant output response and reference input for deriving an error signal, means responsive to the error signal for deriving a control signal for the plant, said control signal being derived for a control signal formulation interval, means for controlling the plant in response to the control signal, said means for deriving including means for combining signals proportional to the control signal of a previous formulation interval and signals proportional to the error signal magnitude at different times within interval for the control signal being formulated.

2. The controller of claim 1 wherein said means for deriving includes means for accumulating the signals proportional to the error signals only during the interval and the control signal of the previously formulated control signal.

3. The controller of claim 2 wherein said means for deriving includes means for introducing proportional factors on the error signal magnitudes, said factors being a function of the occurrence time of the error signal within the formulation interval and the plant input versus output response to provide finite settling time of the plant.

4. The controller of claim 2 wherein said means for deriving includes means for introducing n (where n is an integer equal to or greater than 2) proportionality factors on the error signal magnitudes, said factors being a function of the occurrence time of the error signal within the formulation interval and the plant input versus output response to provide finite settling time for the plant, at least two of said factors being different.

5. The controller of claim 1 wherein said means for deriving includes means for introducing proportional factors on the error signal magnitudes, said factors being a function of the occurrence time of the error signal within the formulation interval and the plant input versus output response to provide finite settling time for the plant.

6. The controller of claim 1 wherein said means for deriving includes means for introducing n (where n is an integer equal to or greater than 2) proportionality factors on the error signal magnitudes, said factors being a function of the occurrence time of the error signal within the formulation interval and the plant input versus output response to provide finite settling time for the plant, at least two of said factors being different.

7. The system of claim 1 wherein said means for deriving includes means for sampling the error signal a plurality of times within each control signal formulation interval to derive the signals proportional to the error signal magnitudes and for sampling the previous control signal magnitude once during each control signal formulation interval to derive the signal proportional to the control signal of the previous formulation interval.

8. The system of claim 7 wherein said combining means includes means for accumulating the sampled signals only over each control signal formulation interval.

9. The system of claim 7 wherein said deriving means includes a single signal multiplying means responsive to the sampled error signals for applying variable proportionality constants to different error samples, as a function of the error sample occurrence time within the formulation interval.

10. A system for controlling in response to a reference wave train having a reference frequency the position of a continuously moving body having means for deriving a variable wave train having variable phase and frequency as a function of the body position and rate of movement comprising means for comparing the reference and variable wave trains to derive an error signal having a frequency equal to the reference frequency, means responsive to a plurality of cycles of the error signal for formulating a single control signal magnitude for the position of the body, said last named means including: means responsive to a previously formulated control signal magnitude, and means for introducing variable weighting factors on different cycles of the error signal as a function of cycle number within the control signal formulation interval; and means for controlling the position of the body in response to sequentially derived control signal magnitudes.

11. The system of claim 10 wherein: said error signal deriving means includes means for deriving means for deriving a pulse width modulated wave for each of said cycles, said means for introducing includes means for deriving a variable number of pulses during each of said cycles, said number being related to the weighting factor for each cycle, and said means for deriving includes means for combining said variable number of pulses with said pulse width modulated wave in accordance with the logical AND function.

12. The system of claim 11 wherein said deriving means includes up-down counter means for accumulating the output of said logical AND means only over each control signal formulation interval, and means for controlling the counter counting direction in response to the polarity of the error signal.

13. A system for controlling the position of a body on a continuously rotating satellite comprising a reference wave train source having a reference frequency, position sensing means for deriving a variable wave train having variable phase and frequency as a function of the body position and rate of movement, means for comparing the reference and variable wave trains to derive an error signal having a frequency equal to the reference frequency, means responsive to a plurality of cycles of the error signal for formulating a single control signal magnitude for the position of the body, said last named means including: means responsive to a previously formulated control signal magnitude, and means for introducing variable weighting factors on different cycles of the error signal as a function of cycle number within the control signal formulation interval; and means for controlling the position of the body in response to sequentially derived control signal magnitudes.

UNITED STATES PATENT OFFICE
CERTIFICATE OF CORRECTION

Patent No. 3,578,957          Dated May 18, 1971

Inventor(s) James A. Gatlin

It is certified that error appears in the above-identified patent and that said Letters Patent are hereby corrected as shown below:

The line designation numbers, located between the columns, in many instances do not identify the correct lines. Accordingly, the lines referred to below are the actual line number--the designated line numbers are not to be used for reference purposes.

Column 2, line 1, after "signals" there should appear --are--;

Column 3, line 15, "$17_{n11}$" should appear as --$17_{n-1}$--;

line 20, "$t_o+_{n11}$" should appear as --$t_o+t_{n-1}$--;

lines 30 and 31, "$B_{n11}$" (in both instances) should appear as --$B_{n-1}$--;

line 32, "$17_{n1}$" should appear as --$17_{n-1}$--; and line 52, "$B_1E = B_1a(R-C)$" should appear as --$B_1E = B_1(R-C)$--.

Column 4, line 1, "$B_{n1},E_{n11}$" should appear as --$B_{n-1}E_{n-1}$--; and line 68, "$1/_s2$" should appear as --$1/s^2$--.

UNITED STATES PATENT OFFICE
CERTIFICATE OF CORRECTION

Patent No. 3,578,957        Dated May 18, 1971

Inventor(s) James A. Gatlin        PAGE - 2

It is certified that error appears in the above-identified patent and that said Letters Patent are hereby corrected as shown below:

Column 5, line 2, "$K/_s 2$" should appear as $-- K/s^2 --$.

Column 9, line 48, "$B_2$" should appear as $-- B_3 --$.

Column 10, line 23, "185" should appear as --184--.

Column 12, lines 29 and 30, "countersaturation" (in both instances) should appear as --counter saturation--.

Column 13, line 52, (in Equation 5), "az" should appear as --+--; and line 54, "$G=Kt^2$" should appear as $-- G=KT^2 --$.

Column 15, line 17, (Equation 19), "$-a_{32}B_n + B_{n11} + ... +B,$" should appear as $-- -a_{32} = B_n + B_{n-1} + ... +B_1 --$;

line 18, "$-a_{33} B_o + \gamma_3 G$" should appear as $-- -a_{33} = B_o + \gamma_3 G --$;

line 20, "(20)" (second occurrence) should not appear;

UNITED STATES PATENT OFFICE
CERTIFICATE OF CORRECTION

Patent No. 3,578,957      Dated May 18, 1971

Inventor(s) James A. Gatlin      PAGE - 3

It is certified that error appears in the above-identified patent and that said Letters Patent are hereby corrected as shown below:

line 44, (Equation 24), "$-U_{2T} = 4\theta_2 \ a/3\theta_1 \frac{3}{8} U_o$" should appear as $-U_{2T} = 4\theta_2 - 3\theta_1 + \frac{3}{8} U_o$ --;

line 49, (Equation 25), "$F = \sum_{i=1}^{n} (B_i)^2 \geq \sigma_U^2/\sigma_e^2$ should appear as -- $F = \sum_{i=1}^{n} (B_i)^2 \geq \sigma_U^2/\sigma_e^2$ --;

line 51, "$\sigma_U^2$" and "$\sigma_e^2$", respectively, should appear as --$\sigma_U^2$-- and --$\sigma_e^2$--; and line 54, "$F=(4)^2(3)^2 = 25$" (Equation 26) should appear as --$F=(4)^2 + (3)^2 = 25$--.

Column 16, line 2, "$4B_1 = 9(1-a4B_o)$" should appear as --$4B_1 = 9(1-4B_o)$--;

line 12, "$(B_o)_{OPT} = 2016/1944 - 0.5185$" should appear as --$(B_o)_{OPT} = 2016/1944 = 0.5185$--;

line 27, "$F=145$" should appear as --$F = 146$--;

UNITED STATES PATENT OFFICE
CERTIFICATE OF CORRECTION

Patent No. 3,578,957      Dated May 18, 1971

Inventor(s) James A. Gatlin      PAGE - 4

It is certified that error appears in the above-identified patent and that said Letters Patent are hereby corrected as shown below:

line 32, "$-a_{31} \frac{1}{2}[4B_4 + 3B_3 + 2B_2 + B_1 a]$" should appear as -- $-a_{31} = \frac{1}{2}[4B_4 + 3B_3 + 2B_2 + B_1]$ --;

line 45, "$2\gamma 3$" should appear as -- $2\gamma_3$ --; and line 59, "$-U_{2T} = 3\theta_4 \: az \: \theta_3 - \theta_2 -_1 + \frac{1}{2} U_0$" should appear as -- $-U_{2T} = 3\theta_4 + \theta_3 - 2\theta_2 - \theta_1 + \frac{1}{2} U_0$ --.

Signed and sealed this 9th day of May 1972.

(SEAL)
Attest:

EDWARD M. FLETCHER, JR.
Attesting Officer

ROBERT GOTTSCHALK
Commissioner of Patents